(12) United States Patent
Kikuchi et al.

(10) Patent No.: US 7,378,166 B2
(45) Date of Patent: May 27, 2008

(54) CELL VOLTAGE MEASURING DEVICE FOR FUEL CELL

(75) Inventors: Hideaki Kikuchi, Kawachi-gun (JP); Masahiko Sato, Utsunomiya (JP); Toshiaki Ariyoshi, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 151 days.

(21) Appl. No.: 10/268,153

(22) Filed: Oct. 10, 2002

(65) Prior Publication Data

US 2003/0072983 A1 Apr. 17, 2003

(30) Foreign Application Priority Data

Oct. 16, 2001 (JP) ............... 2001-318157

(51) Int. Cl.
- H01M 2/18 (2006.01)
- H01M 2/30 (2006.01)
- H01M 8/02 (2006.01)

(52) U.S. Cl. .............. 429/23; 429/22; 429/34
(58) Field of Classification Search ............ 429/22–24, 429/34, 37
See application file for complete search history.

(56) References Cited

U.S. PATENT DOCUMENTS 6,677,066 B1 * 1/2004 Jansen et al. ................. 429/7

FOREIGN PATENT DOCUMENTS

| JP | 09283166 A | * | 10/1997 |
| JP | 11339828 A | * | 12/1999 |
| JP | 2000223141 A | * | 8/2000 |
| JP | 2001256692 | | 9/2001 |
| JP | 2001256991 | | 9/2001 |
| JP | 2001256991 A | * | 9/2001 |
| JP | 2002184434 A | * | 6/2002 |
| WO | WO 99/67869 | * | 12/1999 |

* cited by examiner

Primary Examiner—Tracy Dove
(74) Attorney, Agent, or Firm—Lahive & Cockfield, LLP; Anthony A. Laurentano, Esq.

(57) ABSTRACT

The present invention provides a cell voltage measuring device for a fuel cell comprising: a contact region provided on or in a separator forming the fuel cell; and a terminal contacting the separator at the contact region to measure cell voltage of the fuel cell, wherein the contact region is defined by a groove formed in the outer periphery of the separator, and wherein, in a state in which the terminal is inserted into the groove and contacts the separator, the entire area of the cross-section of the terminal perpendicular to the longitudinal axis thereof at a contact point is disposed in the groove. Accordingly, contact between the terminal and the separator can be preferably retained.

12 Claims, 7 Drawing Sheets

[FIG. 1]
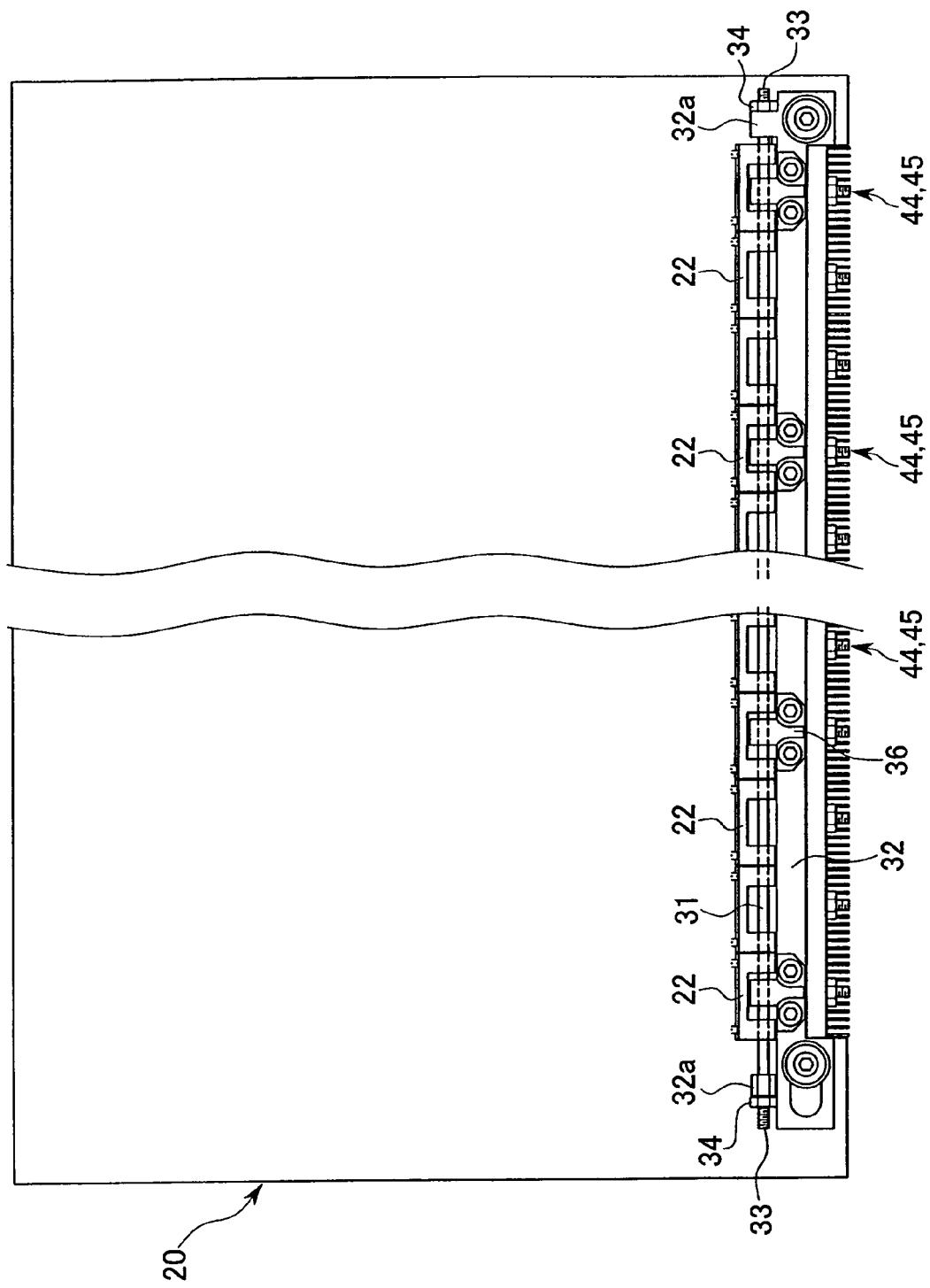

[FIG. 2]
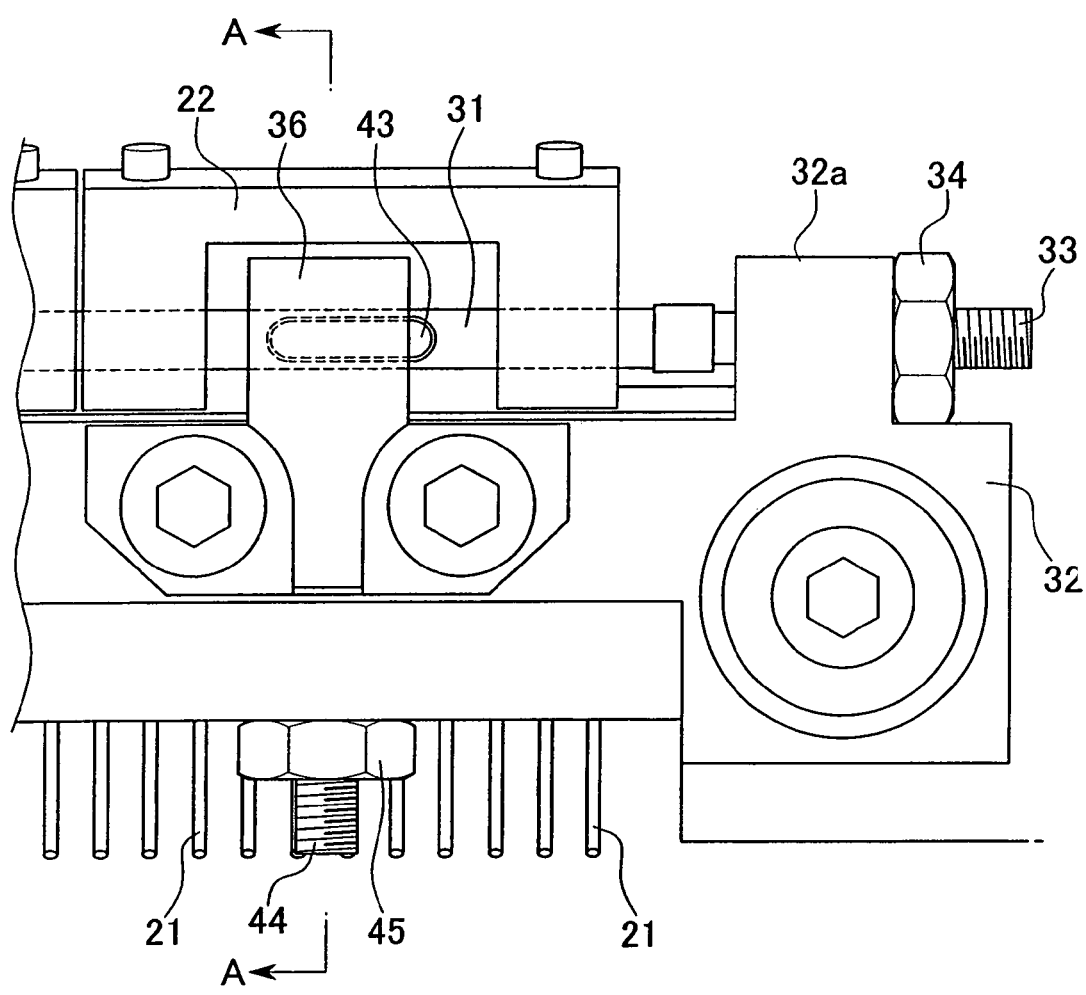

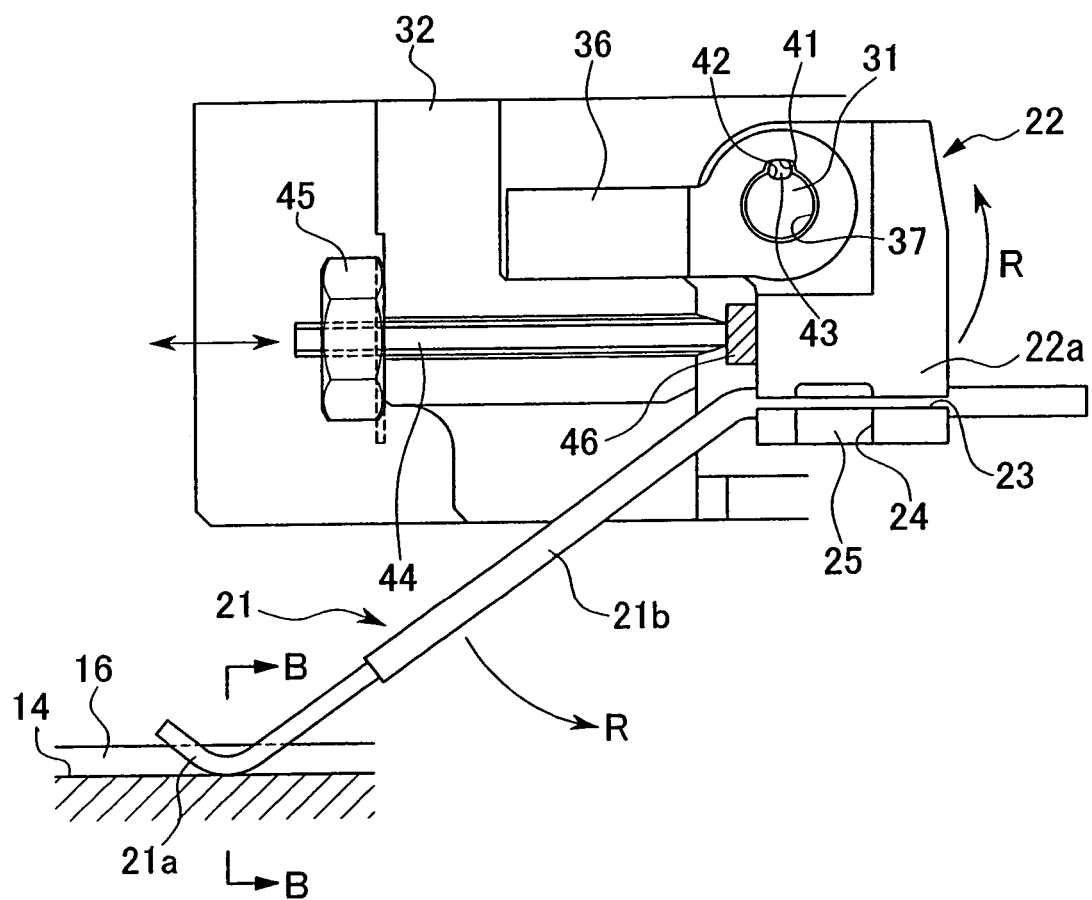
[FIG. 3]

[FIG. 4]
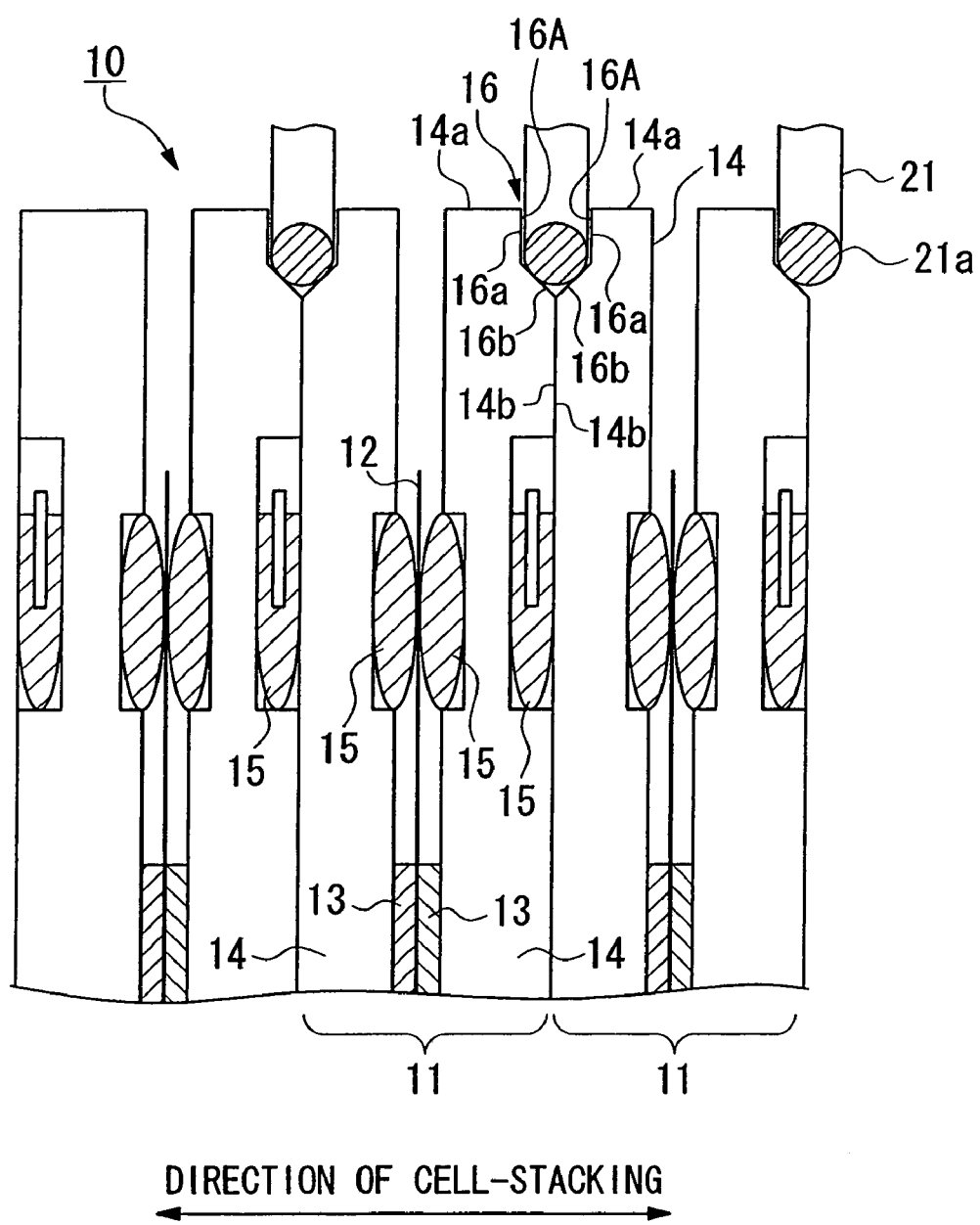
DIRECTION OF CELL-STACKING

[FIG. 5]
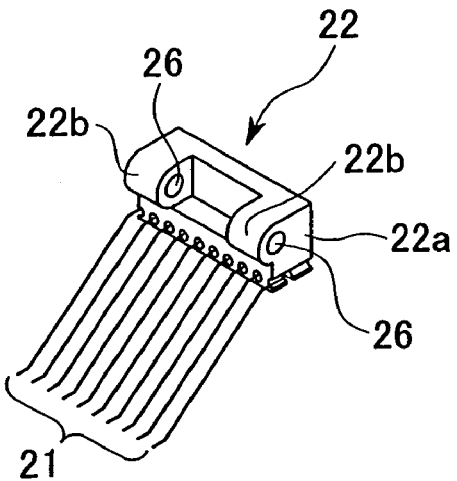
[FIG. 6]
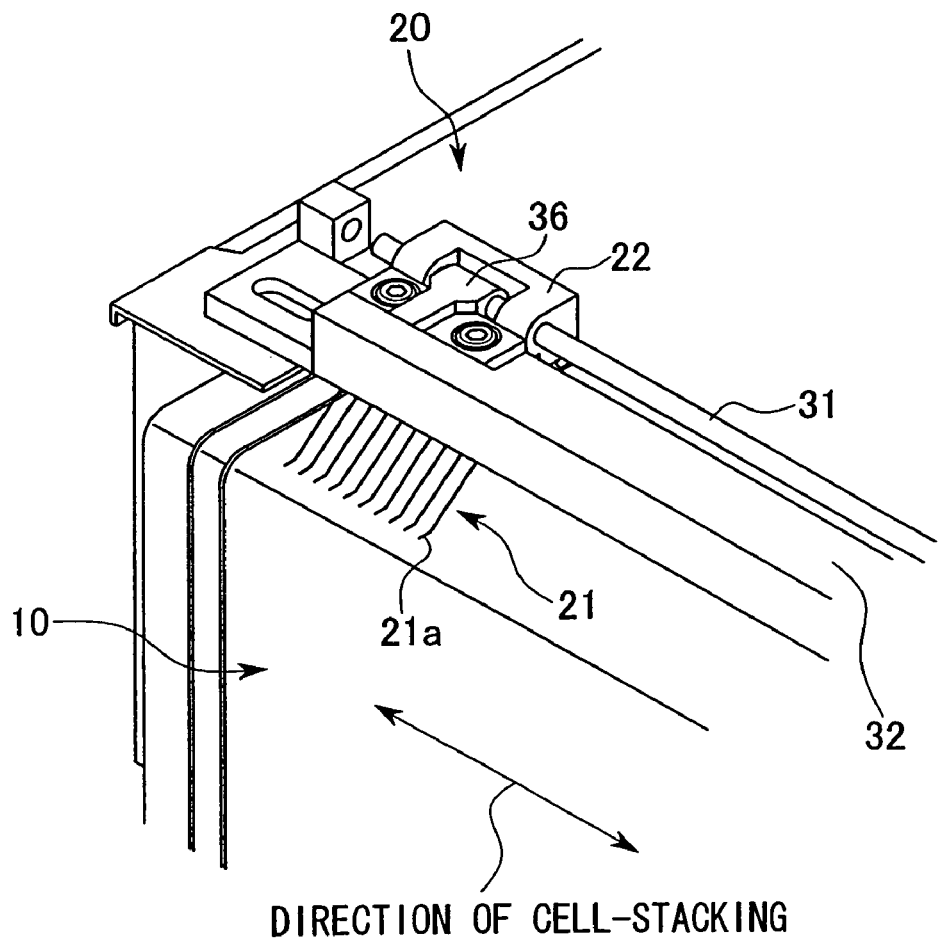
DIRECTION OF CELL-STACKING

[FIG. 7]
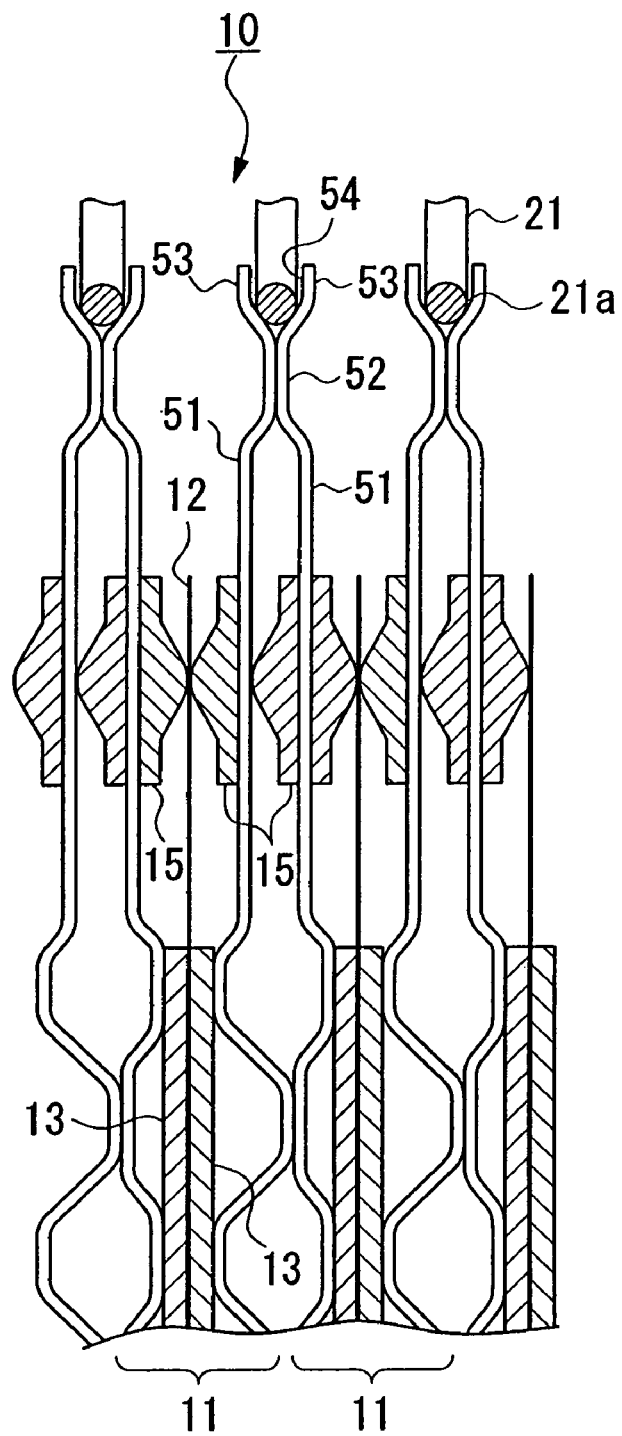
DIRECTION OF CELL-STACKING

[FIG. 8]
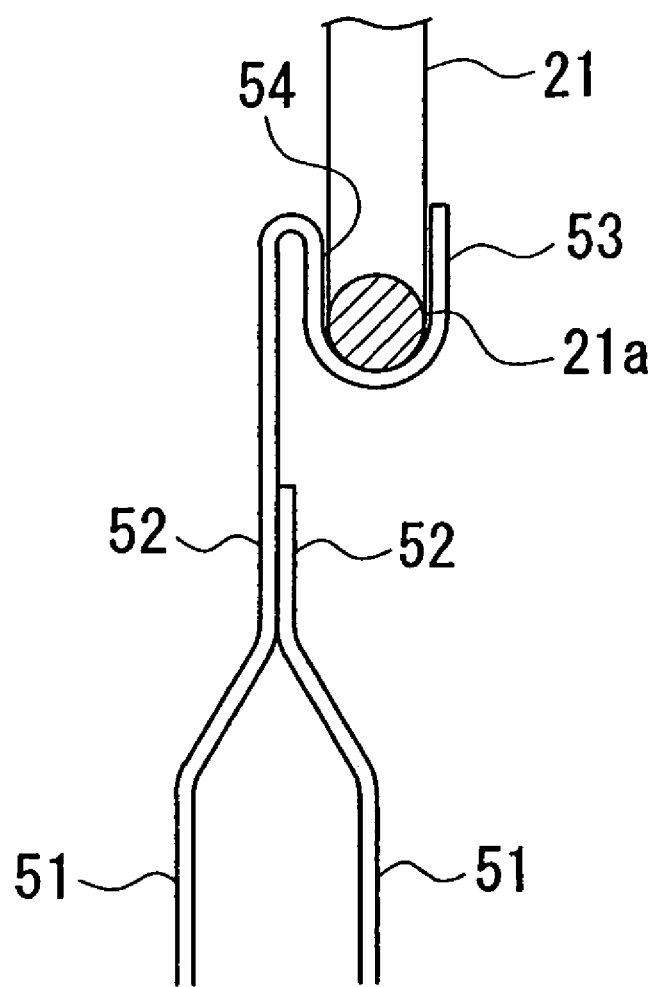

CELL VOLTAGE MEASURING DEVICE FOR FUEL CELL

BACKGROUND OF THE INVENTION

1. Field of the Invention

This invention relates to a cell voltage measuring device for a fuel cell, which measures voltage by terminals contacting separators in the fuel cell.

2. Background Art

A solid polymer electrolyte fuel cell unit (hereinafter simply referred to as a fuel cell unit) comprises: a solid polymer electrolyte membrane as a cation-exchange membrane; an anode electrode and a cathode electrode which together hold the solid polymer electrolyte membrane therebetween; and a pair of separators which hold the anode and cathode electrodes. A plurality of fuel cell units are stacked together to form a fuel cell stack in actual use.

In such a fuel cell stack, as a device which enables monitoring whether or not each fuel cell unit is operating normally, a cell voltage measuring device is known from, for example, Japanese Unexamined Patent Application, First Publication No. Hei 9-283166, in which voltage generated by the fuel cell unit (hereinafter simply referred to as cell voltage) is measured by a terminal inserted into a circular hole formed in the separator.

As another type of device, a cell voltage measuring device in which cell voltage is measured by an elastic terminal which is pressed against the bottom of a groove formed in the separator, is also known.

However, in the former type of cell voltage measuring device, it is difficult to form the circular hole because the separator is thin when the separator is made, for example, by press-forming a thin metal plate.

On the other hand, in the latter type of cell voltage measuring device, high reliability in measuring cell voltage can be obtained because the terminal is pressed against the bottom of the groove and a stable contact resistance can be realized; however, a further improvement is desired because the terminal may come out of the groove due to vibration or the like, depending on the dimensional relationship between the diameter of the terminal and the size of the groove.

SUMMARY OF THE INVENTION

Based on the above problems, an object of the present invention is to provide a cell voltage measuring device for a fuel cell in which the terminal does not easily come out of the groove, and which provides high reliability in measuring cell voltage of the fuel cell.

In order to achieve the above object, a first aspect of the present invention provides a cell voltage measuring device for a fuel cell comprising: a contact region provided on or in a separator forming the fuel cell; and a terminal contacting the separator at the contact region to measure cell voltage of the fuel cell, wherein the contact region is defined by a groove formed in the outer periphery of the separator, and wherein, in a state in which the terminal is inserted into the groove and contacts the separator, more than half the area of the cross-section of the terminal perpendicular to the longitudinal axis thereof at a contact point is disposed in the groove.

According to the above structure, it is possible to prevent the terminal from coming out of the groove even when the cell voltage measuring device is subjected to vibration or the like.

A second aspect of the present invention provides a cell voltage measuring device for a fuel cell comprising: a contact region provided on or in a separator forming the fuel cell; and a terminal contacting the separator at the contact region to measure cell voltage of the fuel cell, wherein the contact region is defined by a groove formed in the outer periphery of the separator, and wherein, in a state in which the terminal is inserted into the groove and contacts the separator, the entire area of the cross-section of the terminal perpendicular to the longitudinal axis thereof at a contact point is accommodated in the groove.

According to the above structure, it is possible to further effectively prevent the terminal from coming out of the groove even when the cell voltage measuring device is subjected to vibration or the like.

The fuel cell may comprise a plurality of separators. In the cell voltage measuring device, the terminal may be rod-shaped, and the groove may be formed between a pair of the separators adjacent to each other.

According to the above structure, it is possible to use thinner separators than in the case in which each of the separators has a groove because only a part of the groove is formed in each of the separators adjacent to each other.

In the groove, the terminal may be surrounded by at least four planar surfaces.

The separator may be made of carbon.

The separator may be made of a metal plate.

When the separator is made of a metal plate, the groove may be formed by deforming the outer periphery of the metal separator.

The fuel cell may comprise a plurality of separators, each of which is made of a metal plate. In this case, the groove may be formed between a pair of the separators adjacent to each other by deforming the outer peripheries of both of the metal separators.

The cell voltage measuring device may further comprise: a shaft which is fixed to the fuel cell and which extends in the direction of stacking thereof; a support unit which holds the terminal and which is rotatably supported by the shaft; and adjusting elements which enable controllable rotation of the support unit about the shaft so as to adjust contact pressure at the contact point between the terminal and the separator.

The present invention also provides a cell voltage measuring device for a fuel cell comprising: contact regions provided on or in separators forming the fuel cell; and terminals contacting the separators at the contact regions to measure cell voltage of the fuel cell; a shaft which is supported by the fuel cell and which extends in the direction of stacking thereof; and a plurality of support units, each of which holds the terminals, and which are slidably supported by the shaft so as to be arrayed in the direction of stacking.

BRIEF DESCRIPTION OF THE DRAWINGS

FIG. 1 is a plan view showing a first embodiment of a cell voltage measuring device for a fuel cell according to the present invention.

FIG. 2 is an enlarged view showing the main portion in FIG. 1.

FIG. 3 is a cross-sectional view taken along the line A-A in FIG. 2.

FIG. 4 is a cross-sectional view taken along the line B-B in FIG. 3 showing the cross-section at a contact point between a terminal and a separator.

FIG. 5 is a perspective view showing a unit forming the cell voltage measuring device.

FIG. 6 is a perspective view showing a portion of a fuel cell stack comprising the same type of cell voltage measuring device as in FIG. 1.

FIG. 7 is a cross-sectional view, corresponding to FIG. 4, showing a second embodiment of a cell voltage measuring device for a fuel cell according to the present invention.

FIG. 8 is an enlarged view showing the main portion of a variant of the cell voltage measuring device according to the second embodiment.

DESCRIPTION OF THE PREFERRED EMBODIMENTS

Several embodiments of the cell voltage measuring device for a fuel cell according to the present invention will now be explained with reference to FIGS. 1 to 8.

FIG. 6 is a perspective view showing a portion of the cell voltage measuring device for a fuel cell in an embodiment. Reference numeral 10 indicates a fuel cell stack, and reference numeral 20 indicates an upper cover provided above the fuel cell stack 10.

As shown in FIG. 4, the fuel cell stack 10 is a stacked body consisting of a plurality of fuel cell units 11 (hereinafter simply referred to as a cell unit or cell units) being stacked in the horizontal direction.

The fuel cell unit 11 comprises: an electrolyte membrane 12; a pair of electrodes 13 which hold the electrolyte membrane 12 therebetween; and a pair of separators 14 which hold the electrodes 13 therebetween. Seals 15 seal the space between the electrolyte membrane 12 and the separator 14, and the space between the separators 14.

The separator 14 in this embodiment is made of carbon and has a substantially rectangular plate shape. In the upper periphery partly forming the outer periphery of the separator 14, there is provided a groove 16 extending along the entire length thereof. More specifically, the groove 16 is formed by disposing a pair of recesses 16A so as to face each other, which are formed in the upper peripheries of the separators 14 which contact each other and each of which forms a part of the cell units 11 disposed adjacent to each other in the direction of cell-stacking. The recess 14A is formed by a vertical surface 16a extending parallel to the side wall 14b of the separator 14 from the upper surface 14a of the separator 14, and a tapered surface 16b diagonally extending from the bottom end of the vertical surface 16a to the side wall 14b of the separator 14. A pair of recesses 16A facing each other form the groove 16 with a cross-section having a shape like a baseball home plate. The groove 16 is used as a contact region for the terminal for measuring cell voltage, which will be explained below.

In FIG. 6, reference numeral 21 indicates the terminals for measuring cell voltage by being disposed in the grooves 16 formed in the separators 14 of the cell units 11. As shown in FIG. 5, a plurality of terminals 21 (ten terminals are included in the case of this embodiment) are integrated in a body 22a (support body) made of resin. Hereinafter, a structure consisting of the terminals 21 and the body 22a will be referred to as support unit 22.

In FIG. 6, only one support unit 22 is shown and others are omitted for simplicity As shown in FIG. 3, the end portion 21a of the terminal 21 at which contact with the groove 16 is made is formed in substantially a J-shape. Each terminal 21 is inserted into an insulating tube 21b except the end portion 21a thereof which is exposed.

The insulating tubes 21b are fixed in the body 22a in such a way that each of the insulating tubes 21b is inserted into one of a plurality of terminals through holes 23 which are formed in the bottom portion of the body 22a and which are arrayed at a predetermined interval in the direction of length (the direction along which the terminals are arrayed), and then resin 25 which will be hardened is supplied into a filling channel 24 formed in the body 22a and opening downward.

With reference to FIGS. 5 and 6, the support unit 22 has a pair of bracket portions 22b at the ends thereof as seen in the direction of length of the body 22a. A plurality of support units 22 are supported by a shaft 31 by disposing the shaft 31 through shaft insert holes 26, each of which is formed in the bracket portion 22b.

Because the inner diameter of the shaft insert hole 26 is made to be larger than the outer diameter of the shaft 31, the support units 22 supported by the shaft 31 are rotatable about the axis of the shaft 31 (rotatable about the shaft 31), and are slidable along the axis.

Each of the support units 22 is properly positioned in the direction of the axis so that each of the terminals 21 can be properly pressed against the corresponding separator 14 even when there is a dimensional variation in the direction of cell-stacking among a plurality of fuel cell stacks 10.

In FIGS. 1, 2, and 6, reference numeral 32 indicates a stay fixed to one of the long sides of the outer periphery of the upper cover 20. As shown in FIGS. 1 and 2, bracket portions 32a, each of which extends from each end of the stay 32 toward the other of the long sides.

Stud bolts 33 which abut the ends of the shaft 31 thread-engage the bracket portions 32a. The axial position of the shaft 31 can be finely adjusted by rotating the stud bolts 33 and by fastening nuts 34 at the ends of the stud bolts 33.

A plurality of holders 36 are disposed on the stay 32 at a predetermined interval along the direction of the long side of the upper cover 20, and each is fixed to the stay 32 at one end thereof.

As shown in FIG. 3, at the other end of each holder 36, there is provided a shaft support hole 37 extending therethrough, and the shaft is supported by being disposed through the shaft support hole 37.

Rotation of the shaft 31 is prevented by engaging a key element 43 with a key groove 41 formed in the inner surface of the holder 36 and with a key groove 42 formed in the outer surface of the shaft 31.

As shown in FIG. 3, a stud bolt 44 engages the stay 32 from the side surface thereof at a position corresponding to the middle point in the direction of length of each of the support units 22.

When the stud bolt 44 moves axially by rotating the stud bolt 44 after loosening a nut 45 which engages the stud bolt 44, the tip of the stud bolt 44 pushes the support unit 22 via an insulating element 46, whereby the support unit 22 rotates counterclockwise about the shaft 31, as shown by an arrow R in FIG. 3.

At that time, a plurality of terminals 21 supported by the support unit 22 also rotate in counterclockwise direction R together with the support unit 22, whereby all of the end portions 21a of the terminals 21 are simultaneously inserted into the grooves 16 formed between the separators 14 of the cell units 11 being stacked in the horizontal direction, and contact the separators 14.

As shown in FIG. 4, in this state, the entire area of the cross-section of each of the terminals 21 perpendicular to the longitudinal axis thereof at a contact point between the end portion 21a and the groove 16 is accommodated in the groove 16. In other words, the size of the groove 16 is predetermined so as to accommodate the end portion 21a when the end portion 21a of the terminal 21 contacts the bottom of the groove 16. The above state is an embodiment among the states in which more than half the area of the cross-section of the terminal 21 is accommodated in the groove 16. As explained above, because the entire area of the cross-section of the terminal 21 is accommodated in the groove 16, and because the end portion 21*a* of the terminal 21 hardly comes out of the groove 16 even when the cell voltage measuring device is subjected to vibration or the like, it is possible to maintain the contact state between the terminal 21 and the separator 14, whereby reliability in measuring cell voltage can be improved. Accordingly, the cell voltage measuring device of the present invention is suitable for a fuel cell stack mounted in a vehicle, which should satisfy anti-vibration requirements.

In the cell voltage measuring device for a fuel cell in this embodiment, because the end portion 21*a* of the terminal 21 can be pressed against the separator 14 merely by a rotating operation, a positioning operation in the direction of stacking is not required; therefore, workability during assembly and maintenance may be improved.

Furthermore, because the pressing force against the separator 14 can be adjusted merely by adjusting the rotational angle of the nut 45, it is possible to adjust the pressing force for every support unit 22 uniformly; therefore, variation in measured cell voltage can be reduced.

In addition, because the end portion 21*a* of the terminal 21 is formed in substantially a J-shape, it is possible to effectively prevent increase in contact resistance due to deformation of the end portion 21*a* of the terminal 21 when the pressing force against the separator 14 is increased; therefore, reliability in measuring cell voltage can be further improved.

Furthermore, because the contact region where the terminal 21 contacts the separator 14 is made as the groove 16 which is formed by a pair of recesses 16A formed in the separators 14 adjacent to each other, and because the width of the groove 16 is distributed to a pair of separators 14, it is possible to make the separator 14 thinner than in the case in which each of the separators has a groove 16. As a result, the fuel cell can be made thinner.

The present invention is not limited to the preferred embodiments explained above, and the specific numbers in the above description are merely examples, and other numbers are also possible.

For example, the tapered surface 16*b* forming the recess 16A in the separator 14 may be a rounded concave surface.

Although the entire area of the cross-section of each of the terminals 21 perpendicular to the longitudinal axis thereof at a contact point between the end portion 21*a* of the terminal 21 and the groove 16 is accommodated in the groove 16 when the end portion 21*a* of the terminal 21 contacts the bottom of the groove 16 in the above embodiment, the advantageous effects of the present invention can be obtained if more than half the area, not the entire area, of the cross-section of the terminal 21 is accommodated in the groove 16.

In the above embodiment, the groove 16 is formed so as to extend along the entire length of the upper periphery of the separator 14; however, the groove 16 may be formed so as to extend along only a part of the upper periphery of the separator 14. Alternatively, the groove 16 may be formed in a projecting portion which is formed along a part of the upper periphery of the separator 14 so as to extend upward.

The position of the groove 16 is not limited to the upper periphery of the separator 14. The groove 16 may be formed in the side periphery or the bottom periphery of the separator 14.

The end portion 21*a* of the terminal 21 is not necessarily formed in substantially a J-shape. The end portion 21*a* may be formed in an arc shape.

Furthermore, although the separator 14 in the above embodiment is made of carbon, the cell voltage measuring device of the present invention can be used for a fuel cell comprising metal separators formed by press-forming metal plates.

FIG. 7, corresponding to FIG. 4, shows the cell voltage measuring device used for a fuel cell comprising the metal separators 51. In FIG. 7, the same reference symbols are appended to the similar elements as in FIG. 4 showing a fuel cell comprising the carbon separator 14, and some description is omitted, and only differences therebetween will be explained below.

A pair of separators 51, each of which forms the cell units 11 disposed adjacent to each other in the direction of cell-stacking, are connected to each other near the outer periphery thereof to form a connected portion 52, and the outer edges 53 extending outward from the connected portion 52 are disposed separately from each other. The curved outer edges 53 form a groove 54 therebetween. The end portion 21*a* of the terminal 21 is inserted into the groove 54 and contacts the bottom of the groove 54. The entire area of the cross-section of the terminal perpendicular to the longitudinal axis of the terminal 21 at the contact point is accommodated in the groove 54. As in the foregoing embodiment, in the cell voltage measuring device for a fuel cell comprising the metal separators 51 formed as explained above, because the end portion 21*a* of the terminal 21 hardly comes out of the groove 54 even when the cell voltage measuring device is subjected to vibration or the like, it is possible to maintain the contact state between the terminal 21 and the separator 51, whereby reliability in measuring cell voltage can be improved.

As shown in FIG. 8, when the metal separators 51 are used, one separator 51 of a pair of separators 51 connected to each other at the connected portion 52 may be provided with its outer edge at the connected portion 52, and only the other separator 51 may be provided with the outer edge 53 outwardly extending from the connected portion 52. In this case, the groove 54 may be formed by deforming the peripheral portion of the outer edge 53 in substantially a U-shape.

As explained above, the following advantageous effects can be obtained. According to the first aspect of the present invention, the terminal hardly comes out of the groove even when the cell voltage measuring device is subjected to vibration or the like; therefore, it is possible to improve reliability in measuring cell voltage.

According to the second aspect of the present invention, the terminal further hardly comes out of the groove even when the cell voltage measuring device is subjected to vibration or the like; therefore, it is possible to improve reliability in measuring cell voltage.

In addition, according to a further aspect of the present invention, it is possible to make the fuel cell thinner because each of the separators can be made thinner than in the case in which each of the separators has a groove.

What is claimed is:

1. A fuel cell assembly having a plurality of fuel cell units stacked in a direction of stacking, each of said fuel cell units including a pair of separators and an electrolyte membrane held between said pair of separators, said fuel cell assembly comprising:

a contact region provided between ones of said separators of said fuel cell units adjacent to each other;

a rod-shaped terminal contacting said separators at said contact region to measure cell voltage of said fuel cell units; and a support unit which holds said rod-shaped terminal and which is rotatable about a shaft so as to adjust contact pressure between said rod-shaped terminal and said separators, wherein said contact region is defined by a groove formed in outer peripheries of said ones of said separators of said fuel cell units adjacent to each other, wherein a portion of said rod-shaped terminal is disposed in said groove and contacts said separators, and more than half an area of a cross-section of said portion of said rod-shaped terminal perpendicular to a longitudinal axis of said rod-shaped terminal is accommodated in said groove, and wherein said groove is formed by a pair of recesses respectively provided in said ones of said separators of said fuel cell units adjacent to each other.

2. A fuel cell assembly having a plurality of fuel cell units stacked in a direction of stacking, each of said fuel cell units including a pair of separators and an electrolyte membrane held between said pair of separators, said fuel cell assembly comprising:

a contact region provided between ones of said separators of said fuel cell units adjacent to each other; and a rod-shaped terminal contacting said separators at said contact region to measure cell voltage of said fuel cell; units and a support unit which holds said rod-shaped terminal and which is rotatable about a shaft so as to adjust contact pressure between said rod-shaped terminal and said separators, wherein said contact region is defined by a groove formed in outer peripheries of said pair of separators adjacent to each other, wherein a portion of said rod-shaped terminal is disposed in said groove and contacts said separators, and an entire area of a cross-section of said portion of said rod-shaped terminal perpendicular to a longitudinal axis of said rod-shaped terminal is accommodated in said groove, and wherein said groove is formed by a pair of recesses respectively provided in said ones of said separators of said fuel cell units adjacent to each other.

3. A fuel cell according to claim 1, wherein said rod-shaped terminal is surrounded by at least four planar surfaces defining said groove.

4. A fuel cell according to claim 2, wherein said rod-shaped terminal is surrounded by at least four planar surfaces defining said groove.

5. A fuel cell according to claim 1, wherein said separators are made of carbon.

6. A fuel cell according to claim 2, wherein said separators are made of carbon.

7. A fuel cell according to claim 1, wherein said separators are made of a metal plate.

8. A fuel cell according to claim 7, wherein said groove is formed by deforming the outer peripheries of said separators.

9. A fuel cell according to claim 2, wherein said separators are made of a metal plate.

10. A fuel cell according to claim 9, wherein said groove is formed by deforming the outer peripheries of said separators.

11. A fuel cell according to claim 1 further comprising:

adjusting elements which enable controllable rotation of said support unit about said shaft so as to adjust contact pressure between said rod-shaped terminal and said separators.

12. A fuel cell according to claim 2 further comprising:

adjusting elements which enable controllable rotation of said support unit about said shaft so as to adjust contact pressure between said rod-shaped terminal and said separators.

* * * * *